United States Patent

Shiell et al.

[11] Patent Number: 5,913,049
[45] Date of Patent: Jun. 15, 1999

[54] MULTI-STREAM COMPLEX INSTRUCTION SET MICROPROCESSOR

[75] Inventors: Jonathan H. Shiell, Plano; Donald E. Steiss, Richardson, both of Tex.

[73] Assignee: Texas Instruments Incorporated, Dallas, Tex.

[21] Appl. No.: 08/903,847

[22] Filed: Jul. 31, 1997

Related U.S. Application Data

[60] Provisional application No. 60/023,296, Jul. 31, 1996.

[51] Int. Cl.$^6$ ........................................ G06F 9/38
[52] U.S. Cl. .................... 395/391; 395/376; 395/382; 395/388; 395/391; 395/392; 395/800.23; 395/800.24
[58] Field of Search .................. 395/800.23, 800.24, 395/391, 388, 382, 383, 376, 392

[56] References Cited

U.S. PATENT DOCUMENTS

| | | |
|---|---|---|
| 5,363,506 | 11/1994 | Fukuoka . |
| 5,404,469 | 4/1995 | Chung et al. ........................ 395/706 |
| 5,430,851 | 7/1995 | Hirata et al. . |
| 5,524,250 | 6/1996 | Chesson et al. ..................... 395/569 |
| 5,546,593 | 8/1996 | Kimura et al. ..................... 395/569 |
| 5,557,766 | 9/1996 | Takiguchi et al. . |
| 5,724,565 | 3/1998 | Dudey .................................. 395/595 |
| 5,761,515 | 6/1998 | Barton, III et al. ................ 395/709 |
| 5,809,450 | 9/1998 | Chrysos et al. ..................... 395/584 |

*Primary Examiner*—William M. Treat
*Attorney, Agent, or Firm*—Gerald E. Laws; Robert D. Marshall, Jr.; Richard L. Donaldson

[57] ABSTRACT

A microprocessor (10) and system (2) including a multi-stream pipeline unit (25) are disclosed. The multi-stream pipeline unit (25) includes individual fetch units (26), instruction caches ($16_i$), and decoders (34) in separate instruction streams (PROC0, PROC1) or pipelines. A common scheduler (36) is provided to check for dependencies among the instructions from the multiple instruction streams (PROC0, PROC1), and to launch instructions for execution by the various execution units (31, 40, 42, 50), including a microcode unit (47). A common register file (39) includes register banks (70) dedicated to each pipeline, and also a register bank (72) that includes temporary and shared registers available to instructions of either instruction stream (PROC0, PROC1), such as useful in the event of register renaming due to a dependency. Each decoded instruction in the scheduler (36) has an identifier (PROC) indicating the one of the instruction streams (PROC0, PROC1) from which it was issued. In the event of an exception requiring one of the pipelines to be flushed, the decoded instructions in the scheduler (36) associated with the flushed pipeline may be invalidated (i.e., the results of their execution ignored), while the instructions in the scheduler (36) associated with the other pipeline may continue to advance and execute normally.

19 Claims, 4 Drawing Sheets

| | CYCLE | | | | | | | | | |
|---|---|---|---|---|---|---|---|---|---|---|
| | n | n+1 | n+2 | n+3 | n+4 | n+5 | n+6 | n+7 | n+8 | n+9 |
| FETCH0 | (0,2) | (0,3) | (0,4) | (0,5)μ | (0,6) | (0,7) | (0,8) | (0,9) | (0,10) | (0,11) |
| PRED0 | (0,1) | (0,2) | (0,3) | (0,4) | (0,5)μ | (0,6) | (0,7) | (0,8) | (0,9) | (0,10) |
| DEC0 | (0,0) | (0,1) | (0,2) | (0,3) | (0,4) | (0,5)μ | (0,6) | (0,7) | (0,8) | (0,9) |
| FETCH1 | (1,2) | (1,3) | (1,4) | F | (1,1) | (1,2) | (1,3) | (1,4) | (1,4) | (1,5) |
| PRED1 | (1,1) | (1,2) | (1,3) | F | – | (1,1) | (1,2) | (1,3) | (1,3) | (1,4) |
| DEC1 | (1,0) | (1,1) | (1,2) | F | – | – | (1,1) | (1,2) | (1,2) | (1,3) |
| SCHEDa | – | (1,0) | (1,1) | – | – | – | μ | (1,1) | (1,1) | – |
| SCHEDb | – | (0,0) | (0,1) | (0,2) | – | (0,4) | μ | (0,6) | (0,7) | – |
| SCHEDc | – | – | – | – | (0,3)μ | – | – | – | – | – |
| EXa | – | – | (1,0)* | (1,1)ˣ | – | – | – | μ | μ | (1,1) |
| EXb | – | – | (0,0) | (0,1) | (0,2) | – | (0,4) | μ | (0,6) | (0,7) |
| EXc | – | – | – | – | – | (0,3)μ | – | – | – | – |

PROC0: FETCH0, PRED0, DEC0
PROC1: FETCH1, PRED1, DEC1
SCHEDULER: SCHEDa, SCHEDb, SCHEDc
EXECUTION: EXa, EXb, EXc

MULTI-STREAM COMPLEX INSTRUCTION SET MICROPROCESSOR

This application claims priority under 35 USC 119(e)(1) of the provisional application No. 60/023,296 filed Jul. 31, 1996.

This invention is in the field of microprocessor integrated circuits, and is more specifically directed to pipelined microprocessor architectures.

BACKGROUND OF THE INVENTION

In the field of microprocessors and other programmable logic devices, many improvements have been made in recent years which have resulted in significant performance improvements. One such improvement is the implementation of pipelined architectures. In a pipelined microprocessor, as is well known in the art, multiple sequential program instructions are processed simultaneously along various stages of execution from instruction fetch through execution and writeback. As a result, later instructions (in program order) are fetched prior to completion of the execution of earlier instructions in pipelined microprocessors. Because of pipelining, the effective rate at which instructions are executed by a microprocessor can approach one instruction per machine cycle in a single pipeline microprocessor, even though each individual instruction may require multiple machine cycles for processing from fetch through execution and writeback.

Another approach to increasing instruction throughput is the use of so-called superscalar microprocessor architecture. Superscalar microprocessors issue multiple instructions for execution in each machine cycle, and thus effectively have multiple pipelines operating in parallel, providing even higher theoretical performance levels over the scalar, pipelined microprocessor architecture.

As is well known in the art, microprocessors having pipelined architectures, especially if superscalar, are vulnerable to operating hazards that are commonly referred to as dependencies. In general, dependencies are situations in which a resource, such as a register or memory location, is required by multiple instructions that are at different stages in the pipeline. For example, a first instruction may be directed to write the results of its operation to a particular register while a second instruction, later in the program flow, may require the contents of that same register as an input operand to its instruction. If, in this example, the input operand to the second instruction is fetched prior to execution of the first instruction, a program error due to a register dependency is present. Other dependencies include similar conflicts relative to memory locations, and conflicts between instructions regarding microprocessor resources. An example of a resource conflict in a complex instruction set (CISC) microprocessor may involve the execution of a microcode sequence by multiple instructions in the pipeline, where the later instruction is precluded from accessing microcode from the microsequencer until completion of an earlier-issued microcode instruction. Other dependencies arising in pipelined microprocessors will, of course, be well known to those of ordinary skill in the art.

Each instance of a dependency involves some amount of handling, such as a pipeline stall, register renaming, and the like. Since the likelihood of a dependency increases with its depth (including both the number of stages in a pipeline and the number of effective pipelines), the performance degradation resulting from dependencies limits the pipeline depth in a microprocessor. In addition, the effect of exceptions such as mispredicted branches and other events causing a pipeline flush increases dramatically with the depth and parallelism of pipelines. Accordingly, the design of pipelined microprocessors generally involves a tradeoff between the performance improvement obtained with increasing pipeline depth and superscalar width, on one hand, and the deleterious effects of increased dependency and exception frequency and overhead, on the other hand.

By way of further background, U.S. Pat. No. 5,430,851 describes a microprocessor having multiple instruction streams, each having an instruction setup unit for fetching and decoding the instruction. A common scheduling unit is provided according to this architecture, receiving decoded instructions from each of the multiple instruction streams, and issuing or scheduling each decoded instruction to an appropriate one of the multiple execution units. This reference also discloses multiple scheduling units, each coupled to multiple instruction streams.

In each of the disclosed examples in the above-referenced U.S. Pat. No. 5,430,851, dependencies are checked and handled in each of the multiple instruction streams, prior to scheduling of the instructions. In this arrangement, no instruction is apparently issued to the scheduling units unless dependencies have been checked and, if any found, handled. This approach appears to be limited in its ability to efficiently handle exceptions, mispredicted branches, interrupts, and other events that cause pipeline flushes. In addition, none of the examples in the above-referenced U.S. Pat. No. 5,430,851 are shown as using microcoded instructions or sequences. As a result, the implementations illustrated in the above-referenced U.S. Pat. No. 5,430,851 are primarily useful in connection with RISC (Reduced Instruction Set Computer) architectures, where the complexity of each instruction is maintained at a minimum, with complex sequences handled in the compilation of the code, or by upstream circuitry.

By way of further background, multi-stream microprocessors of the so-called "barrel" type are also known in the art. According to this approach, instruction execution alternates among the streams at instruction boundaries. For example, a conventional two-stream barrel processor will process instructions from one stream on even cycles and from the other stream on odd cycles. This type of processing thus introduces limitations in the flexibility and performance of the microprocessor.

SUMMARY OF THE INVENTION

The present invention may be implemented into a microprocessor and accompanying system, in which multiple pre-schedule instruction streams are provided in the execution pipeline. Each of the instruction streams includes a fetch unit and a decode unit, and is for issuing decoded instructions to a scheduler in a sequence that is independent of the other instruction streams. The scheduler applies the decoded instructions from each of the streams to the appropriate execution units, and also checks the instruction streams for any dependencies that may be presented both interstream and intrastream. A common register file is provided, having architectural registers dedicated to each instruction stream, and also having other registers that may be used by either stream, for example in the case of register renaming to avoid resource dependencies. Each instruction includes an identifier code to indicate the stream with which it is associated, to assist in instruction invalidation in the event that a flush is necessary.

It is an object of the present invention to provide a microprocessor and system in which multiple instruction streams may be processed independently and in parallel along much of the pipeline.

It is a further object of the present invention to provide such a microprocessor in which dependencies may be checked and handled in the common portion of the multi-stream pipeline.

It is a further object of the present invention to provide such a microprocessor in which both dedicated and shared registers are made available to the multiple instruction streams.

It is a further object of the present invention to provide such a microprocessor in which microcoded sequences may be called by scheduled instructions.

It is a further object of the present invention to provide such a microprocessor in which instructions from the various streams may be scheduled and issued to different execution units in the same machine cycle.

Other objects and advantages of the present invention will be apparent to those of ordinary skill in the art having reference to the following specification together with its drawings.

DETAILED DESCRIPTION OF THE PREFERRED EMBODIMENT

Figure 1:
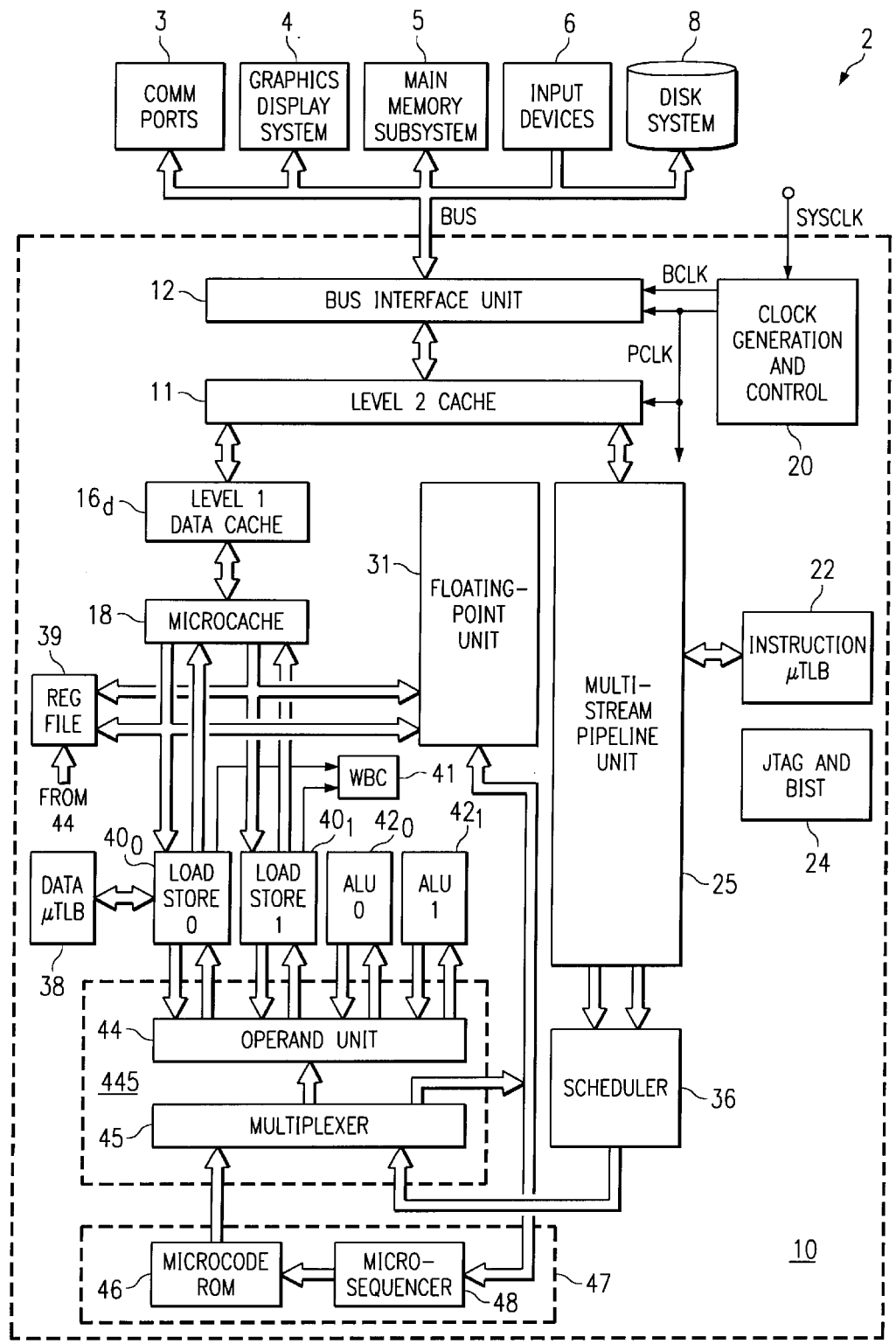
FIG. 1 is an electrical diagram, in block form, of a microprocessor and system according to the preferred embodiment of the invention.

Referring to FIG. 1, an exemplary data processing system 2, including an exemplary superscalar pipelined microprocessor 10, and constructed according to the preferred embodiment of the invention, will now be described. It is to be understood that the architecture of system 2 and of microprocessor 10 is described herein by way of example only, as it is contemplated that the present invention may be utilized in microprocessors and systems of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 10, as shown in FIG. 1, is connected to other system devices by way of external bus BUS. While external bus BUS is shown as a single bus in this example, it is of course contemplated that external bus BUS may represent multiple buses having different speeds and protocols, for example as is known in conventional computers utilizing the PCI local bus architecture. System 2 contains such conventional subsystems as communication ports 3 (including modem ports and modems, network interfaces, and the like), graphics display system 4 (including video memory, video processors, a graphics monitor), main memory system 5 which is typically implemented by way of dynamic random access memory (DRAM), input devices 6 (including keyboard, a pointing device, and the interface circuitry therefor), and disk system 8 (which may include hard disk drives, floppy disk drives, and CD-ROM drives). It is therefore contemplated that system 2 of FIG. 1 corresponds to a conventional desktop computer or workstation, as now common in the art. Of course, other system implementations of microprocessor 10 can also benefit from the present invention, as will be recognized by those of ordinary skill in the art.

Microprocessor 10 includes bus interface unit (BIU) 12 connected to external bus BUS, which controls and effects communication between microprocessor 10 and the external elements in system 2. BIU 12 includes the appropriate control and clock circuitry to perform this function, including write buffers for increasing the speed of operation, and timing circuitry so as to synchronize the results of internal microprocessor operation with bus BUS timing constraints. Microprocessor 10 also includes clock generation and control circuitry 20 which generates clock phases based upon system clock SYSCLK; in this example, clock generation and control circuitry 20 generates bus clock BCLK which is the controlling clock signal for bus operations upon external bus BUS, and core clock PCLK which is the controlling clock signal for internal operation of microprocessor 10.

Microprocessor 10 has three levels of internal cache memory, with the highest of these as level 2 cache 11, which is connected to BIU 12 by way of an internal bus. In this example, level 2 cache 11 is a unified cache, and is configured to receive all cacheable data and cacheable instructions from bus BUS via BIU 12, such that much of the bus traffic presented by microprocessor 10 is accomplished via level 2 cache 11. Of course, microprocessor 10 may also effect bus traffic around cache 11 by treating certain bus reads and writes as "not cacheable". Level 2 cache 11 is connected to two level 1 caches 16; level 1 data cache $16_d$, shown in FIG. 1, is dedicated to data storage of operands to, and results from, the execution units of microprocessor 10. As will be described in further detail hereinbelow, multi-stream pipeline unit 25 includes multiple level 1 instruction caches $16_i$, each dedicated to storage of instructions for an associated pipeline, or instruction stream. In this example, microcache 18 is a fully dual-ported level 0 data cache.

As shown in FIG. 1, microprocessor 10 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer (μTLB) 38 is provided to translate logical data addresses into physical addresses, in the conventional manner.

According to the preferred embodiment of the invention, as illustrated in FIG. 1, the multiple execution units are controlled by way of multiple pipelines of six stages each, with write-back. Several of these stages are contained within multi-stream pipeline unit 25, as will be described in further detail hereinbelow. The pipeline stages in microprocessor 10 according to this embodiment of the invention are as follows:

F Fetch: This stage generates the instruction address and reads the instruction from the instruction cache or memory for each stream PD Predecode stage: This stage determines the length and starting position of up to three fetched x86-type instructions in each stream, and extracts the x86 instruction bytes and recodes them into fixed length format for decode DC Decode: This stage translates the x86 instructions for each stream into atomic operations (AOps)

SC Schedule: This stage is common to the multiple pipeline streams, and assigns up to four AOps to the appropriate execution units (including FPU 31)

OP Operand: This stage retrieves the register operands indicated by the AOps

EX Execute: This stage runs the execution units according to the AOps and the retrieved operands WB Write-back: This stage stores the results of the execution in registers or in memory Referring back to FIG. 1, the pipeline stages noted above are performed by various functional blocks within microprocessor 10. The fetch, predecode, and decode stages are performed, for multiple pipelines or instruction streams, within multi-stream pipeline unit 25, the construction and operation of which will be described in detail hereinbelow. The output of multi-stream pipeline unit 25 consists of multiple atomic operations (AOps), which are substantially equivalent to RISC instructions, issued from each of the pipeline streams in multi-stream pipeline unit 25. According to this embodiment of the invention, two pipeline streams are processed in parallel by multi-stream pipeline unit 25, and each stream presents up to nine AOps to scheduler 36 for queuing therein and processing thereby.

The construction of scheduler 36 will also be described in detail hereinbelow. In general, scheduler 36 reads up to four AOps from its queue from instruction stream, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers in register file 39 that are ready to be stored, and also performs address generation for AOps of the load and store type.

Microsequencer 48 and microcode ROM 46 (cumulatively referred herein to as microcode unit 47) control ALUs 42 and load/store units 40 in the execution of microcode entry AOps, which are generally the last AOps to execute in a cycle. In this example, microsequencer 48 applies a sequence of addresses to microcode ROM 46, retrieving therefrom microcoded microinstructions that effect complex or rarely-used x86 instructions, x86 instructions that modify segment or control registers, handling of exceptions and interrupts, and multi-cycle instructions (such as REP instructions, and instructions that PUSH and POP all registers). The microcode instructions are applied by microcode unit 47 to scheduler 36, according to this embodiment of the invention, for issuance to the appropriate execution units in a manner consistent with the normal instructions.

Microprocessor 10 also includes circuitry 24 for controlling the operation of JTAG scan testing, and of certain built-in self-test (BIST) functions, ensuring the validity of the operation of microprocessor 10 upon completion of manufacturing, and upon resets and other events.

Figure 2:
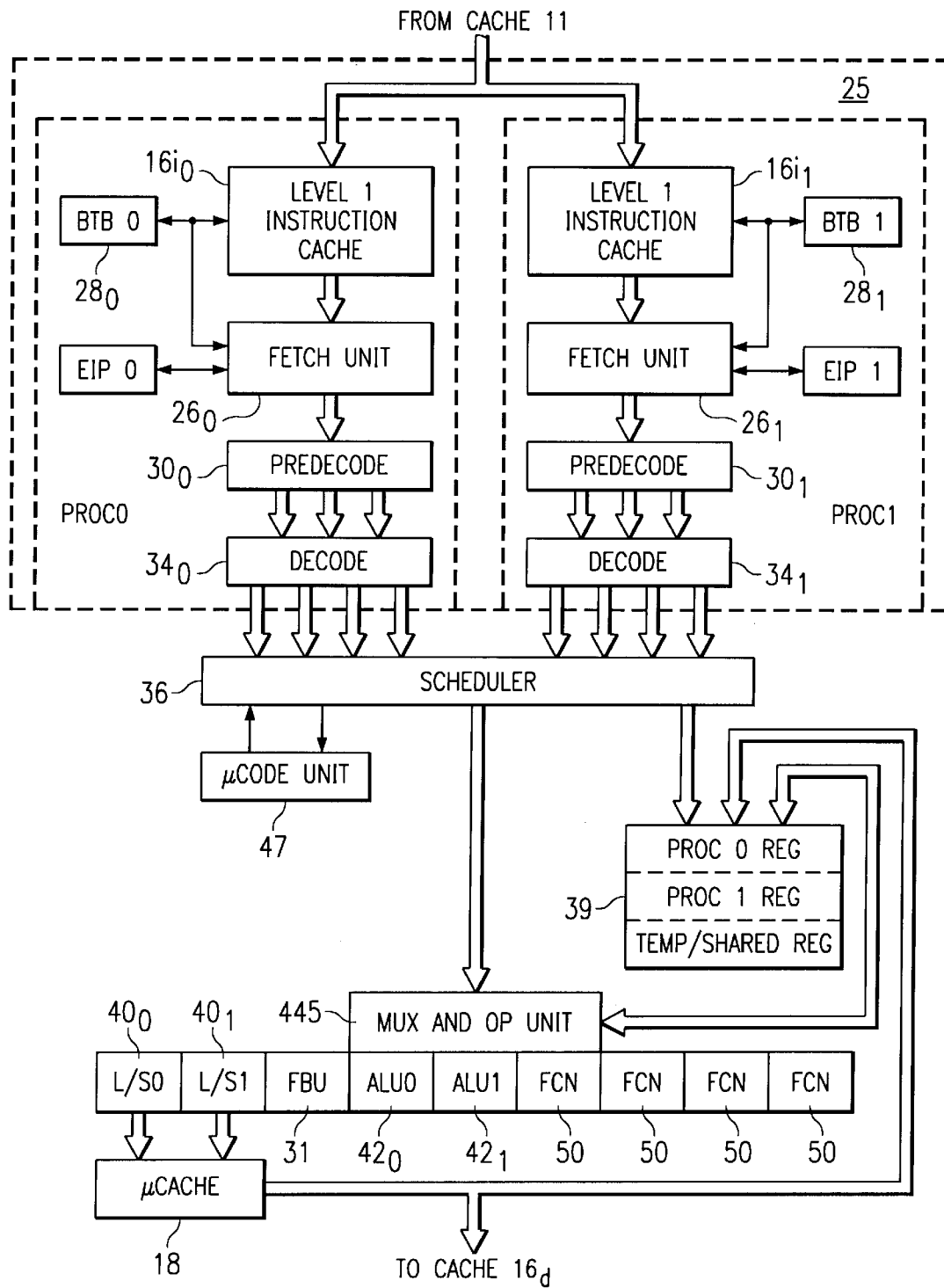
FIG. 2 is an electrical diagram, in block form, of the multi-stream pipeline unit in, and its cooperative relationship with other elements of, the microprocessor of FIG. 1 according to the preferred embodiment of the invention.

Referring now to FIG. 2, the construction of multi-stream pipeline unit 25, and its cooperative relationship with other elements of microprocessor 10, will now be described in detail. In this example, two independent instruction streams PROC0, PROC1 are included within multi-stream pipeline unit 25. It is of course contemplated that more than two instruction streams may be provided in multi-stream pipeline unit 25, as desired for the particular architecture.

According to this embodiment of the invention, each of instruction streams PROC0, PROC1 include a dedicated level 1 instruction cache $16_i$. Instruction caches $16_i$ are each connected to level 2 unified cache 11 (FIG. 1), and store instruction codes and addresses in the conventional manner. However, according to this embodiment of the invention, the instructions stored in each of instruction caches $16_{i0}$, $16_{i1}$ are those related (in the cache sense, by having nearby addresses) to instructions previously fetched by its associated instruction stream PROC0, PROC1, respectively.

Each of instruction streams PROC0, PROC1 includes a dedicated fetch unit $26_0$, $26_1$, respectively. Fetch units $26_0$, $26_1$ each generate instruction addresses based upon an associated instruction pointer EIP 0, EIP1, and apply these instruction, or fetch, addresses to its associated level 1 instruction cache $16_{i0}$, $16_{i1}$. The instruction address may be generated by way of instruction micro-translation lookaside buffer 22 (FIG. 1). Fetch units 26 may be implemented in the conventional manner known in the art. Preferably, each fetch unit 26 operates in association with a branch target buffer (BTB) $28_0$, $28_1$, so that the instruction fetched following a branching instruction may be selected according to a branch prediction algorithm. While BTBs 28 may be constructed according to conventional designs, U.S. Provisional Application No. 60/008,168, filed Oct. 31, 1995, commonly assigned herewith, and incorporated herein by this reference, describes a particularly beneficial BTB implementation.

In each instruction stream PROC0, PROC1, instruction cache $16_i$ (directly, or indirectly in the event of a cache miss) provides a stream of instruction codes to fetch unit 26 according to the sequence of generated fetch addresses. Fetch unit 26 forwards the instruction codes to predecode stage 30, in sequence. Predecode stage 30 determines the size and position of as many as three variable-length x86 instructions, and recodes these multi-byte instructions into a fixed-length format to facilitate decoding. Decode unit 34, in this example, contains four instruction decoders, each capable of receiving a fixed length x86 instruction from predecode stage 30 and of producing from one to three atomic operations (AOps), which are substantially equivalent to RISC instructions. According to this embodiment of the invention, decode stages 34 in instruction streams PROC0, PROC1 each present up to nine AOps to scheduler 36. As illustrated in FIG. 2, scheduler 36 is common to both instruction streams PROC0, PROC1.

Figure 3:
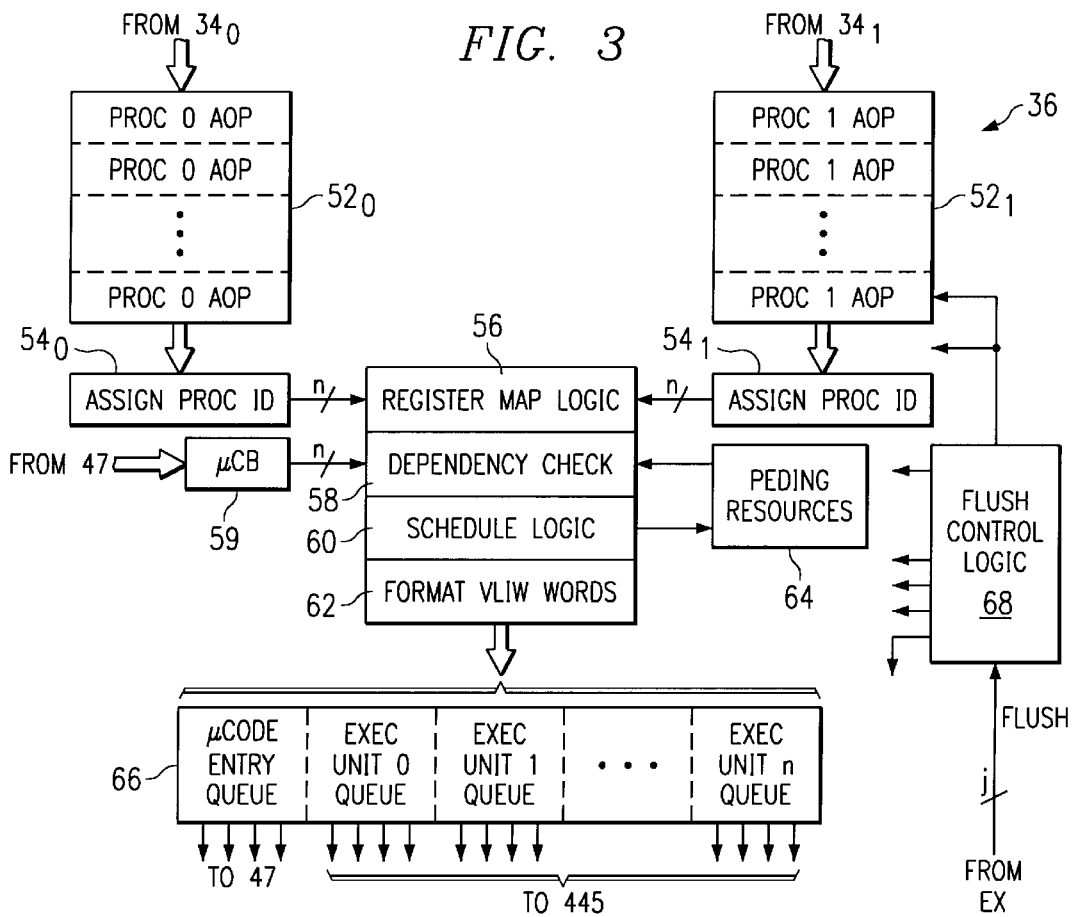
FIG. 3 is an electrical diagram, in block form, of the scheduler of the microprocessor of FIG. 1 according to the preferred embodiment of the invention.

Referring now to FIG. 3, the construction of scheduler 36 will now be described in detail. Scheduler 36 includes AOp queues $52_0$, $52_1$ which receive multiple AOps from respective decode units $34_0$, $34_1$, and arrange the AOps in sequence for scheduling. AOp queues 52 present up to four AOps for scheduling, in this example, after assignment of an ID code to each AOp, as performed in this example by assignment blocks 54. Of course, the decode stages 34 in each of instruction streams PROC0, PROC1 may insert the stream ID code into the AOp during decode, in the alternative. According to the preferred embodiment of the invention, scheduler 36 schedules AOps from each of the multiple instruction streams PROC0, PROC1 without regard to the stream from which they were decoded; however, identification of their instruction stream is necessary in order to perform an effective flush of the instructions from one of the instruction streams without affecting instructions from the other instruction stream.

Figure 4:
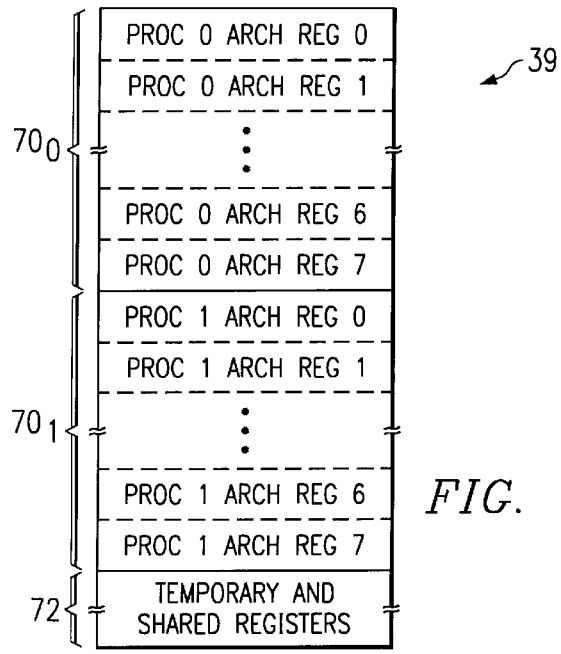
FIG. 4 is an electrical diagram, in block form, illustrating the arrangement of registers in the register file of the microprocessor of FIG. 1 according to the preferred embodiment of the invention.

The format for AOps after assignment of the identification code by assignment blocks 54 will now be described. The format of AOps associated with different execution units (ALU, L/S, etc.) will typically have different formats, as necessary for execution of the particular operations. According to this preferred embodiment of the invention, the format of AOps after instruction stream identification will now be described with respect to the following table:

performs the usual instruction scheduling functions, carried out in the conventional manner. By way of explanation, as shown in FIG. 3, register map logic 56 receives the AOps from assignment blocks 54, and performs the function of mapping the architectural registers requested by the AOps to physical register locations in register file 39. Referring now to FIG. 4, the arrangement of register file 39 according to this embodiment of the invention will now be described.

As evident from FIG. 1, register file 39 is a shared register file, in that instructions from both instruction streams PROC0, PROC1 utilize registers therein. Register file 39 includes register bank $70_0$ which corresponds to the architecture registers of instruction stream PROC0, and register bank $70_1$ which corresponds to the architecture registers of instruction stream PROC1; in the case of microprocessor 10, which is of the x86 architecture type, each of register banks 70 contain the eight x86 architecture registers required by the instruction set. Register banks $70_0$, $70_1$ are dedicated to instruction streams PROC0, PROC1, respectively, in that instructions from instruction stream PROC1 cannot access registers in register bank $70_0$, and vice versa. The physical

| | | | | Number of bits per field | | | | | | | |
|---|---|---|---|---|---|---|---|---|---|---|---|
| Type | 0 | 4:0 | 3:0 | 1:0 | 5:0 | 5:0 | 1:0 | 5:0 | 9:0 | 2:0 | 3:0 |
| ALU | PROC | x86id | Type | op # | rd0 | rd1 | size | wr0 | opcde | n/a | cc grp |
| Load | PROC | x86id | Type | op # | rd0 | rd1 | size | wr0 | opcde | fsize | offset |
| Store | PROC | x86id | Type | op # | rd0 | rd1 | size | rd2 | opcde | fsize | offset |
| Entry | PROC | x86id | Type | op # | microcode ROM entry address and associated info | | | | | | |
| FPU | PROC | x86id | Type | op # | frd0 | frd1 | fext | fwr0 | opcde | fentry/ROM | |

As evident in this table, each AOp includes a PROC field to identify the instruction stream PROC0, PROC1 with which it is associated, along with an x86id instruction identifier from within the stream (to indicate program order), a "Type" indicator to indicate its AOp type, and the field "op #" to indicate its AOp number in sequence. AOps of the ALU, load, store, and FPU type include register read fields rd0, rd1 (frd0, frd1, in the case of FPU AOps) and register write field wr0 (fwr0, in the case of FPU AOps), indicating the read and write registers to be used in connection with the AOp; AOps of these types also include an "opcde" field within which the opcode for the AOp is conveyed. AOps of the ALU, load, store, and (microcode) entry types also include a "size" field to indicate the operand size; FPU AOps include the "fext" bits to indicate extended FPU opcodes.

AOps used in microprocessor 10 also include certain type-specific fields, as noted above. ALU AOps include the field "cc grp" to indicate condition code read/write groups. Load and store AOps include "fsize" fields to indicate the size of FPU load and store operands, and "offset" fields to be used as offset table indices. As shown in the table, microcode entry AOps provide microcode entry point and other address information for use in accessing microcoded instructions from microcode ROM 47; this information may include the number or identification of execution units required for the sequence. FPU AOps include the "fentry/ROM" field, which indicate the entry address into a microcode ROM contained within FPU 31, if the floating-point AOp corresponds to a microcoded floating-point sequence.

In each case, the combined six bits of the PROC and x86id fields provide a single six-bit instruction identifier, and permit up to thirty-two instruction entries for each instruction stream PROC0, PROC1, according to this embodiment of the invention.

These AOps are forwarded to the main logic in scheduler 36, which is shown in block form in FIG. 3. Scheduler 36 mapping performed by map logic 56 (FIG. 3) may therefore be implemented by merely adding an offset to the register addresses indicated in the "rd0", "rd1", "wr0", "rd2" fields of AOps generated by instruction stream PROC1.

Register file 39 also includes register bank 72, which contain shared and temporary registers, usable by instructions from either of instruction streams PROC0, PROC1. The shared registers in bank 72 are particularly useful in the execution of microcode sequences. It is also contemplated that registers in register bank 72 will be especially useful in performing register renaming to handle register conflicts arising from the pipelined instructions.

Register map logic 56 thus maps the registers requested by each of the AOPs to the physical register locations of register file 39. As noted above, this mapping will include the addition of an offset to select the architecture registers for instruction stream PROC1 (i.e., register 0010 indicated internally within instruction stream PROC1 may be mapped to register address 1010 in register file 39). In addition, this instruction stream indicator bit may also be used in the mapping of registers to be used in microcode sequences, again by adding the offset for the architecture registers associated with instruction stream PROC1.

In this regard, referring back to FIG. 2, scheduler 36 includes dependency check logic 58, which analyzes the mapped registers required by the AOps processed through register map logic 56 for resource conflicts among themselves, and relative to previously scheduled instructions. Dependency check logic 58 performs this function with reference to the registers desired by AOps therein, and relative to registers previously designated by scheduled instructions, which are stored in pending resources registers 64. Pending resources registers 64 includes the addresses of registers used in the execution of scheduled instructions, and which are also the destination registers for the results of those instructions. Dependency check logic 58 also receives microcode instructions from microcode unit 47 via microcode buffer 59, for use in this operation. In the event that dependencies are detected, dependency check logic 58 is operable to perform register renaming within the AOps, in the conventional manner.

Once dependencies have been checked and handled, AOps originating from both instruction streams PROC0, PROC1, and from microcode unit 47 are forwarded to schedule logic 60. Schedule logic 60 compiles all information from these AOps and microcode instructions, and decides which instructions to launch to the execution units, in which order. According to this embodiment of the invention, microcode instructions receive the highest priority in scheduling; in other words, if a microcode instruction is to be performed by a particular execution unit, AOps from instruction streams PROC0, PROC1 that also require that execution unit are not scheduled until the microcode sequence is complete. Priority between AOps from instruction streams PROC0, PROC1 may be handled according to any conventional priority arbitration scheme.

Each AOp or microcode instruction that is ready to be launched is next forwarded to format circuitry 62, which formats the AOps into a VLIW (Very Long Instruction Word) control word, ready for execution by the desired execution units; microcoded instructions are typically already in this form, in which case reformatting is not necessary. Format circuitry 62 then presents the VLIW control word to control word queues 66, which buffer and queue the VLIW control words in a manner associated with the various execution units. If the VLIW control word includes a microcode entry AOp, the control word is forwarded to microcode unit 47, via a portion of queue 66 as shown in FIG. 3.

Figures 5, 6:
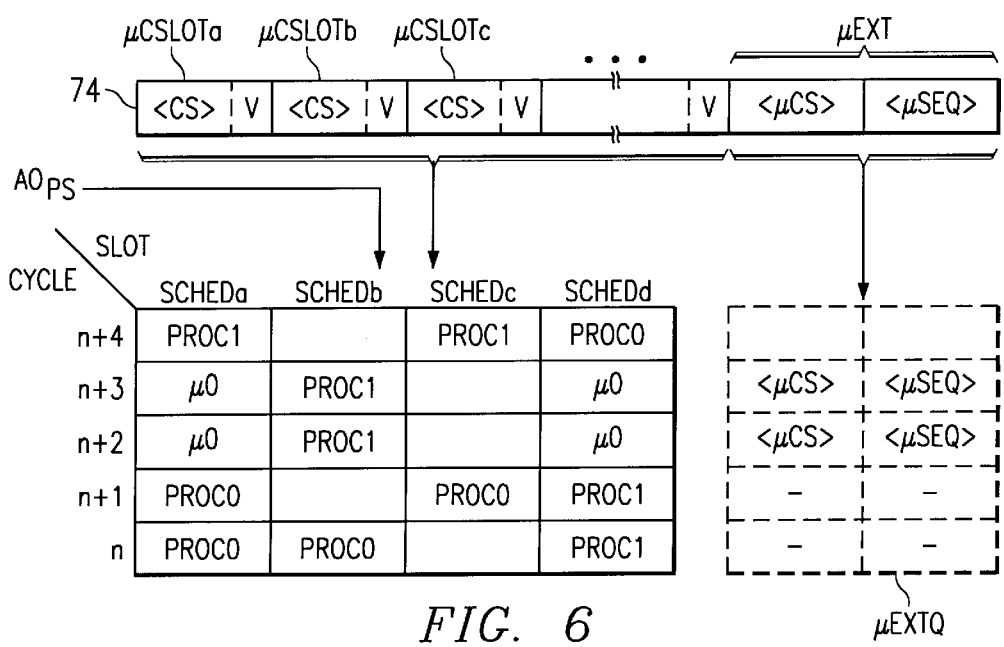
FIG. 5 is a pipeline diagram illustrating the progression and execution of an exemplary sequence of instructions through the microprocessor of FIG. 1 according to the preferred embodiment of the invention.
FIG. 6 is a chart illustrating the contents of a microcode control word and an example of the scheduling of microcode instructions according to the preferred embodiment of the invention.

Referring now to FIG. 6, the scheduling of microcode instructions in combination with non-microcode AOps according to the preferred embodiment of the invention is illustrated. As illustrated in FIG. 6, microcode schedule word 74 includes a group of slots $\mu$CSLOTa, $\mu$CSLOTb, $\mu$CSLOTc, etc., each of which contain the state of microcode control signals CS to be launched to a corresponding execution unit by scheduler 36. For example, slot $\mu$CSLOTa may be associated with ALU $41_0$, slot $\mu$CSLOTb may be associated with ALU $41_1$, slot $\mu$CSLOTc may be associated with floating-point unit 31, and so on. Each slot $\mu$CSLOT also includes a valid bit V, which indicates whether it contains valid control signals CS for the current microcode instruction; of course, a mask may be provided separately from the slots in microcode schedule word 74 to convey this information. According to this preferred embodiment of the invention, microcode schedule word 74 effectively also includes microcode extension portion $\mu$EXT, which contains additional microcode control signals $\mu$CS, and also microcode sequence indicator $\mu$SEQ. According to this embodiment of the invention, the control and sequence information in microcode extension portion $\mu$EXT remains in the microcode domain, and thus remains in microcode unit 47 in a manner that is associated with the progress of the microcode instruction through scheduler 36 and into execution.

In operation, microcode unit 47 forwards microcode schedule word 74 to scheduler 36 in each cycle. As noted hereinabove, microcode instructions receive the highest priority in scheduling, such that other AOps are scheduled to the extent that slots are available. In operation, each cycle in which execution of a microcode sequence is to occur, microcode schedule word 74 will include the appropriate control signals CS in the appropriate slot $\mu$CSLOT along with valid bit V set therein. Microcode schedule word 74 is received by scheduler 36, which forwards the control signals CS in those slots $\mu$CSLOT having valid bits V set directly to a corresponding schedule slot SCHED in the VLIW control word to be launched in that cycle. Scheduler 36 then schedules AOps for other non-microcode instructions into any remaining slots SCHED not occupied by control signals CS from microcode unit 47.

According to the preferred embodiment of the invention, FIG. 6 illustrates an example of this operation will now be described in detail, relative to four scheduler slots SCHEDa through SCHEDd. In earliest cycle n, two instructions from instruction stream PROC0 are scheduled into slots SCHEDa, SCHEDb, and one instruction from instruction stream PROC1 is scheduled into slot SCHEDd in the same VLIW control word in that cycle. In cycle n+1, two instructions from instruction stream PROC0 are scheduled into slots SCHEDa, SCHEDc, and one instruction from instruction stream PROC1 is scheduled into slot SCHEDd. In this example, slot SCHEDc corresponds to microcode unit 47, in that microcode entry AOps are scheduled into slot SCHEDc; accordingly, one of the instructions from instruction stream PROC0 scheduled in cycle n+1 is a microcode entry instruction.

In cycle n+2, microcode schedule word 74 forwards control signals CS in slots $\mu$CSLOTa, $\mu$CSLOTd, along with set valid bits V, to scheduler 36. In response, scheduler 36 forwards these control signals CS its slots SCHEDa, SCHEDd. Microcode unit 47 maintains the associated signals for the $\mu$EXT portion in association with these instructions. Because, as noted above, microcode is scheduled first, followed by the assignment of AOps to those slots not used in the scheduling of microcode, scheduler 36 determines if any current non-microcode AOps are directed to execution units other than those utilized by the microcode instructions, and if so, schedules those AOps to the extent that resources are available. This is illustrated in cycles n+2, n+3 of FIG. 6, in which microcode called from instruction stream PROC0 is scheduled into slots SCHEDa, SCHEDd (indicated by the legend $\mu$0), and in which a non-microcode AOp from instruction stream PROC1 is scheduled into slot SCHEDb in each cycle. In cycle n+4, scheduling of only non-microcode AOps is again shown, with an instruction from instruction stream PROC0 scheduled into slot SCHEDd, and two instructions from instruction stream PROC1 scheduled into slots SCHEDa, SCHEDc. According to this arrangement, the flow of microcode sequences through scheduler 36 is maintained at the highest priority, to obtain best performance.

Referring back to FIG. 3, scheduler 36 also includes flush control logic 68. Flush control logic 68 receives signals on lines FLUSH from downstream in the pipeline, typically from the execution units, which indicate that an exception has occurred that requires flushing of the pipeline. Examples of such exceptions include mispredicted branches, execution results requiring reprocessing (e.g., denormalized floating-point results), and the like. Typically, these events will require the instructions from only one of instruction streams PROC0, PROC1 to be flushed, but the instructions from the other stream may continue to execute. As described hereinabove, each AOp within scheduler 36 (and as scheduled) contains an identifier that indicates the instruction stream from which it was issued. As will be described in further detail hereinbelow, flush control logic 68 will "invalidate" the instructions from only the one of instruction streams PROC0, PROC1 affected by the exception, permitting the scheduling and execution of the instructions from the other instruction schemes to continue.

Further detail regarding the construction of scheduler 36 according to the preferred embodiment of the present invention is provided in U.S. application Ser. No. 08/903,775 filed Jul. 31, 1997 entitled "Microprocessor with Circuits, Systems, and Methods for Out-of-Order Instruction Execution Using a Scheduling Table", filed contemporaneously herewith, commonly assigned herewith, and incorporated herein by this reference.

Referring back to FIG. 2, scheduler 36 communicates the scheduled VLIW control words from queue 66 (FIG. 3) to multiplexer and operand unit 445 (which cumulatively refers to multiplexer 45 and operand unit 44 of FIG. 1). Multiplexer and operand unit 445 performs the function of reading instruction input operands from register file 39, according to the directives in the VLIW control words for each instruction, and of applying the operands and VLIW control words to the appropriate execution units. As illustrated in FIG. 2, the set of execution units includes load/store units 40 (each of which are in communication with microcache 18, and to level 1 data cache 16$d$ and the remainder of the memory resources as shown in FIG. 1), FPU 31, ALUs 41, and other execution units that may be present in microprocessor 10 (illustrated generally as functions 50 in FIG. 2). The register writeback of results from the execution performed by the scheduled instructions is handled by multiplexer and operand unit 445, as illustrated in FIG. 2; multiplexer and operand unit 445 is also capable of forwarding results back to an execution unit, in the conventional manner. Microcache 18 also communicates data to register file 39, as illustrated in FIG. 2.

Referring back to FIG. 1, microprocessor 10 further includes writeback conflict check circuit 41. Writeback conflict check circuit 41 is in communication with each of load/store units 40, and receives the destination addresses of pending but not yet completed writeback operations being performed thereby. Because of the multiple instruction streams PROC0, PROC1, which operate in a somewhat independent manner relative to one another, and also in cases where self-modifying code is permitted, it is possible that a writeback may be made to a memory location to which a writeback is pending from the other load/store unit 40, or to a memory location from which an instruction has already been fetched and is in the pipeline. Writeback conflict check circuit 41 is provided to keep track of the addresses of instructions fetched by the multiple instruction streams PROC0, PROC1, and of writeback addresses, and to alert scheduler 36 in the event that a writeback conflict is present, responsive to which serialization and restart of microprocessor 10 will be effected. Writeback conflict check circuit 41 may be implemented in the conventional manner, by maintaining a table of addresses of the instructions currently in the pipeline against which each writeback address is compared. Alternatively, writeback conflict check circuit 41 may be implemented by maintaining a window of possible conflicting addresses (e.g., the minimum and maximum addresses fetched), according to which the pipeline may be flushed if a potential conflict arises.

The overall operation of microprocessor 10 in executing sequences of instructions will now be described in detail relative to FIG. 5. FIG. 5 is a chart illustrating the progress of a relatively simple sequence of instructions through the pipeline of microprocessor 10. In the example of FIG. 5, only one instruction is issued to and scheduled by scheduler 36 in each cycle; of course, as described hereinabove, each instruction stream PROC0, PROC1 is capable of issuing multiple AOps to scheduler 36 in each cycle, and scheduler 36 is in turn capable of scheduling multiple AOps in each cycle. In addition, the various queue stages are not considered in this example. Accordingly, the example of FIG. 5 is kept relatively simple, for clarity of description.

In the initial cycle n of the example of FIG. 5, each of instruction streams PROC0, PROC1 is full, in that an instruction is resident in each of its fetch, predecode, and decode stages. The nomenclature of FIG. 5 illustrates each instruction by paired indices in the form of (stream, instruction); for example, the instruction (1,2) corresponds to instruction 2 of instruction stream PROC1. In cycle n, instruction stream PROC0 has instruction (0,0) in its decode stage DEC0, instruction (0,1) in its predecode stage PRED0, and instruction (0,2) in its fetch stage (0,2); instruction (0,2) is thus later in program order than instruction (0,1), which is later in program order than instruction (0,0). Stages FETCH1, PRED1, and DEC1 of instruction stream PROC1 are similarly filled. Typically, the particular instruction sequences that are received by instruction streams PROC0, PROC1 are selected by fetch units 26 as needed to maintain the pipelines full. Each instruction stream PROC0, PROC1 retrieves a full cache line into its instruction cache 16$_i$ from which it retrieves its instruction sequence until the next miss, when it again retrieves a cache line.

In the simplified example of FIG. 5, the scheduling of instructions is generally shown as advancing one instruction per instruction stream PROC0, PROC1 in each cycle. As described hereinabove, however, multiple instructions from one of the instruction streams PROC0, PROC1 may be scheduled in each machine cycle. For example, in a given cycle, two instructions from instruction stream PROC0 and no instructions from instruction stream PROC1 may be scheduled in the case of a resource conflict. An example of such a resource conflict in microprocessor 10 occurs where one of the instructions from instruction stream PROC0 is a microcode entry or floating-point AOp, for either of which only one resource is available, and where an instruction from instruction stream PROC1 also is directed to that resource. In this event, and assuming that instruction stream PROC0 has priority, the AOp from instruction stream PROC1 will not be scheduled and scheduler 36 will merely schedule another instruction from instruction stream PROC0, scheduling no instructions from instruction stream PROC1 in this cycle. In general, scheduler 36 will schedule instructions according to a priority scheme to schedule the highest priority instructions, and will then schedule AOps into the remaining slots as available.

Referring again to FIG. 5, in cycle n+1, the instructions have each advanced, such that scheduler 36 has received and is scheduling instructions (1,0), (0,0) to the appropriate execution units, according to the directives within the instructions (which are in the form of AOps, at this stage). As noted above, scheduler 36 can launch multiple instructions to the execution units in the same machine cycle, and as such microprocessor 10 is of the superscalar type. The scheduling performed by scheduler 36 relative to instructions (1,0), (0,0) includes the sequence of processes discussed above. First, the AOps corresponding to instructions (0,0), (1,0) have the instruction stream code added thereto, so that identity of each instruction with its instruction stream PROC0, PROC1, is maintained. Map logic 56 maps the source and destination registers to the actual registers in register file 39 in this cycle n+1 for instructions (1,0), (0,0), and dependency check logic 58 analyzes the AOps for any dependencies; temporary or shared registers in bank 72 are associated with the AOps in the event a dependency is detected. Instructions (1,0), (0,0) are also formatted into VLIW control words by format logic 62 in scheduler 36, and are placed into execution queue 66 for execution as appropriate. In FIG. 5, the schedule slots SCHEDa, SCHEDb, SCHEDc are associated with the execution units EXa, EXb, EXc, respectively. The instructions in instruction streams PROC0, PROC1 also advance to the next pipeline stage in cycle n+1, and new instructions (0,2), (1,2) are fetched by the respective fetch units 26.

In cycle n+2, execution of instructions (0,0), (1,0) is performed by the execution units to which the AOps directed the operation. The instructions (0,1), (1,1) that were in the decode stages in cycle n+1 have now advanced to scheduler 36, as shown in FIG. 5, and the instructions in instruction streams PROC0, PROC1 have similarly advanced.

According to the example shown in FIG. 5, the execution of instruction (1,0) in cycle n+2 has resulted in an exception (as shown by the asterisk in the Figure) that requires the flushing of its pipeline. Referring back to FIG. 3, the flush is indicated in cycle n+3 by flush control logic 68 receiving a signal on one of lines FLUSH, and applying the appropriate control signals to each of the appropriate components of scheduler 36. Each of the instructions associated with instruction stream PROC1 (which issued the exception-causing instruction) must therefore be eliminated from the pipeline. According to this embodiment of the invention, the flushing is accomplished by conventional pipeline flushing of all stages in instruction stream PROC1 in multi-stream pipeline unit 25; in the example of FIG. 5, the instructions in the FETCH1, PRED1, and DEC1 stages are therefore flushed. The common portions of the pipeline, namely scheduler 36 and downstream, are not flushed, however, as this would require flushing all instructions therein, including those associated with instruction stream PROC0 for which flushing is not required by the exception of instruction (1,0). Accordingly, those instructions in scheduler 36 (and downstream) that are associated with instruction stream PROC1 are invalidated, as identified by the stream identifier bit in its AOp code as assigned by assignment block $54_1$. These invalid instructions continue to advance down the pipeline, but their results are ignored. As such, in cycle n+3, instruction (1,1) is actually executed by one of the execution units, but the results will not be written back to memory or to a register.

In cycle n+4, instruction stream PROC0 continues to advance through its sequence of instructions, while instruction stream PROC1 begins again with instruction (1,1), which is the instruction immediately following the instruction (1,0) that caused the exception and required the flush. As noted above, instruction (1,1) was previously executed, but its results were ignored in processing the flush. The instructions in instruction stream PROC0 were unaffected by the flush, and as such continue to advance in cycles n+4, n+5, etc.

In cycle n+4, instruction (0,3) is scheduled into slot SCHEDc. In this example, instruction (0,3) is a microcode entry AOp, as indicated by the $\mu$ symbol in FIG. 5, and as such is scheduled into slot SCHEDc, which is assigned to microcode unit 47 in this example. Accordingly, the execution of instruction (0,3)$\mu$ in cycle n+5 is performed by accessing the microcode entry address in microcode ROM 46 of microcode unit 47, under the control of microsequencer 48. According to this embodiment of the invention, as described hereinabove in detail, microcode instructions are executed with priority relative to non-microcode AOps. This is evident in cycles n+6, n+7, n+8, where the microcode instruction $\mu$ is scheduled in the manner described hereinabove, and is executed to the exclusion of other instructions, namely to the exclusion of instruction (1,1) from instruction stream PROC1 which must wait at scheduler 36 before launch. This priority determination is generally performed, in this embodiment of the invention, by schedule logic 60 scheduling the microcode instruction and reserving its execution units first, prior to the scheduling of non-microcode AOps, as described hereinabove. Instruction (1,1) must therefore wait until the microcode sequence called by instruction (0,3) is completed, following which its execution may commence, as shown in cycle n+9.

As illustrated in cycle n+8 of FIG. 5, the execution of additional instructions from instruction stream PROC0 can continue during the completion of the microcode sequence, assuming that no resource conflict is presented thereby.

As noted above, the operation of microprocessor 10 according to this embodiment of the invention also involves the checking of pending writeback addresses relative to one another, and relative to instructions that have been fetched. This continued checking will ensure that memory coherency is maintained, and avoids program errors in the event of self-modifying code events.

The preferred embodiment of the invention described hereinabove provides important advantages in the operation and performance of a microprocessor and system. The provision of multiple instruction streams according to the preferred embodiment of the invention greatly improves the throughput of instructions through the microprocessor, in a manner that permits CISC techniques such as microcoded instructions to be used. Pipeline maintenance is improved by the present invention, in which dependencies are checked at the time of scheduling, permitting at least one instruction to be sent to scheduling in each machine cycle. In addition, the flushing of the pipeline in the event of an exception is performed in a way that permits the unaffected instruction stream to continue, because of the identification of instructions with their instruction stream.

While the present invention has been described according to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor, comprising:

a memory for storing instruction codes and operands;

a plurality of execution units, for executing data processing instructions;

a plurality of instruction streams, each comprising:

a fetch unit for accessing the memory to fetch instruction codes therefrom according to a program order; and an instruction decoder for decoding the fetched instruction codes;

a scheduler, for checking dependencies in the decoded instruction codes from each of the plurality of instruction streams, the decoded instruction codes having an identifier therein indicating from which of the plurality of instruction streams it was received, and for communicating control signals to the plurality of execution units according to the decoded instruction codes.

2. The microprocessor of claim 1, further comprising:

a register file coupled to the execution units and comprising a plurality of registers, wherein at least some of the plurality of registers are available for use in connection with instruction codes decoded by each of the plurality of instruction streams.

3. The microprocessor of claim 2, wherein the register file comprises:
a first group of registers associated with a first one of the plurality of instruction streams, available for use in connection with instruction codes decoded thereby;
a second group of registers associated with a second one of the plurality of instruction streams, available for use in connection with instruction codes decoded thereby;
a third group of registers available for use in connection with instruction codes decoded by each of the plurality of instruction streams.

4. The microprocessor of claim 1, wherein one of the plurality of execution units comprises:
a microcode unit, coupled to the scheduler, for communicating microcode control words to the scheduler responsive to the scheduler communicating control signals to the microcode unit to access a microcoded instruction sequence.

5. The microprocessor of claim 4, wherein the scheduler is also for communicating the microcode control words received from the microcode unit to one of the plurality of execution units to execute an operation corresponding thereto.

6. The microprocessor of claim 1, wherein each of the plurality of instruction streams further comprises:
an instruction cache, coupled to the memory and to the fetch unit, for storing instruction codes.

7. The microprocessor of claim 1, wherein the instruction codes fetched by the fetch unit are of variable length;
and wherein each of the plurality of instruction streams further comprises:
a predecode stage, coupled between the fetch unit and the instruction decoder, for recoding the instruction codes into fixed length format and applying the recoded instruction codes to the instruction decoder.

8. The microprocessor of claim 1, further comprising:
a bus interface unit, coupled on one side to the instruction execution pipeline and to the memory, and coupled on the other side to an external bus; and
external subsystems coupled to the external bus.

9. The microprocessor of claim 1, wherein the plurality of execution units comprise:
an arithmetic logic unit; and
a first load/store unit, coupled to the memory, for retrieving operands therefrom and for storing execution results therein.

10. The microprocessor of claim 9, further comprising:
a second load/store unit, coupled to the memory, for retrieving operands therefrom and for storing execution results therein; and
a writeback control unit, for comparing addresses of the memory to which the first and second load/store units are storing execution results, to detect conflicts.

11. A method of operating a microprocessor, comprising the steps of:
in a first pipeline, performing the steps of:
sequentially fetching a first sequence of instructions from a memory;
sequentially decoding each fetched instruction of the first sequence;
in a second pipeline, performing the steps of:
sequentially fetching a second sequence of instructions from a memory;
sequentially decoding each fetched instruction in the second sequence;
applying a pipeline indicator to each of the decoded instructions in the first and second sequences; and
using a common scheduler, scheduling decoded instructions from the first and second sequences for execution by selected ones of a plurality of execution units, according to directives in the decoded instructions.

12. The method of claim 11, wherein the scheduling step comprises:
mapping registers designated in decoded instructions of the first sequence to a first group of registers in a register file; and
mapping registers designated in decoded instructions of the second sequence to a second group of registers in the register file.

13. The method of claim 12, wherein the scheduling step further comprises:
checking the decoded instructions of the first and second sequences for dependencies; and
responsive to the checking step identifying a dependency, mapping at least one register designated in a decoded instruction having a dependency to a shared register in the register file.

14. The method of claim 11, further comprising:
operating the execution units to execute the decoded instructions of the first and second sequences; and
responsive to an executed instruction of the first sequence resulting in an exception, invalidating each of the decoded instructions of the first sequence in the common scheduler.

15. The method of claim 14, further comprising:
responsive to an executed instruction of the first sequence resulting in an exception, flushing the first pipeline.

16. The method of claim 15, further comprising:
after the flushing step, continuing the steps of scheduling and executing decoded instructions from the second sequence, and the steps of sequentially fetching and decoding the second sequence of instructions in the second pipeline.

17. The method of claim 11, wherein one of the plurality of the execution units is a microcode unit;
and further comprising:
responsive to a decoded instruction in either the first or second sequence corresponding to a microcode entry instruction, calling a microcode sequence from the microcode unit;
using the common scheduler, scheduling the microcode sequence for execution by at least one of the plurality of execution units, according to directives in the microcode sequence.

18. The method of claim 17, wherein the scheduling of the microcode sequence has a higher priority than the scheduling of decoded instructions from the first and second sequences.

19. The method of claim 11, wherein, in the first pipeline, the fetching step sequentially fetches the first sequence of instructions from a first instruction cache;
and wherein, in the second pipeline, the fetching step sequentially fetches the second sequence of instructions from a second instruction cache.

* * * * *